United States Patent
Hong et al.

[11] Patent Number: 5,902,626
[45] Date of Patent: May 11, 1999

[54] HERB AND/OR SPICE BLENDS HAVING IMPROVED DISPERSIBILITY AND HYDRATION

[75] Inventors: Yeong-Ching Albert Hong, Buffalo Grove; Lori Lynn Spurlock, Zion; Maragaret Ann Poole, Libertyville, all of Ill.

[73] Assignee: Kraft Foods, Inc., Northfield, Ill.

[21] Appl. No.: 08/946,161

[22] Filed: Oct. 7, 1997

[51] Int. Cl.⁶ ........................................... A23C 19/00
[52] U.S. Cl. .................... 426/582; 426/407; 426/409; 426/578; 426/589; 426/658
[58] Field of Search ................... 426/582, 407, 426/409, 578, 589, 658

[56] References Cited

U.S. PATENT DOCUMENTS

| | | | |
|---|---|---|---|
| H1229 | 9/1993 | McGinley et al. | 426/654 |
| 2,356,501 | 8/1944 | Brown et al. | 99/140 |
| 2,957,771 | 10/1960 | Prater et al. | 99/140 |
| 3,922,354 | 11/1975 | Galluzi et al. | 426/96 |
| 3,985,913 | 10/1976 | Johnson et al. | 426/650 |
| 4,232,047 | 11/1980 | Sair et al. | 426/96 |
| 4,544,568 | 10/1985 | Heyland | 426/650 |
| 4,828,841 | 5/1989 | Porter et al. | 424/479 |
| 4,946,693 | 8/1990 | Risler et al. | 426/243 |
| 5,124,162 | 6/1992 | Boskovic et al. | 426/96 |
| 5,130,156 | 7/1992 | Bergquist et al. | 426/453 |
| 5,232,732 | 8/1993 | Harris et al. | 426/589 |
| 5,320,860 | 6/1994 | Duval et al. | 426/582 |
| 5,387,431 | 2/1995 | Fuisz | 426/658 |
| 5,429,836 | 7/1995 | Fuisz | 426/601 |

FOREIGN PATENT DOCUMENTS 216 437   4/1987   European Pat. Off. .

OTHER PUBLICATIONS

Product Brochure, MALTRIN QD™ M440, Grain Processing Corporation, Undated.

MALTRIN™ Maltodextrins and Corn Syrup Solids, Grain Processing Corporation, 1996.

*Primary Examiner*—Mina Bhat
*Attorney, Agent, or Firm*—Fitch, Even, Tabin & Flannery

[57] ABSTRACT

A method for improving the dispersability and hydration of herbs and spices into a viscous sauce is provided wherein at least one herb or spice is blended with an agglomerated maltodextrin to provide a dispersable and easily hydrated herb and spice blend. The invention is also directed to a herb and spice blend which is dispersable in a viscous sauce. The herb and spice blend is a mixture of at least one herb or spice and an agglomerated maltodextrin.

20 Claims, No Drawings

HERB AND/OR SPICE BLENDS HAVING IMPROVED DISPERSIBILITY AND HYDRATION

FIELD OF THE INVENTION

The present invention relates to a herb and spice blend and method for providing the herb and/or spice blend with improved dispersability and hydration. More particularly, the present invention is directed to providing a herb and/or spice blend which readily disperses and hydrates in a viscous sauce, such as a cheese sauce.

BACKGROUND OF THE INVENTION

It is well known that herbs and spices are difficult to disperse in certain fluid food products, such as viscous sauces. U.S. Pat. No. 5,130,156 to Bergquist, et al. describes a method for agglomerating powdered food products to increase their dispersability. As discussed in the Bergquist, et al. patent, many spray dried food powders do not disperse readily in water. They may also be dusty and not very free-flowing. Agglomeration of dried food powders is a means for giving the product good dispersing and dispensing properties. The Bergquist, et al. patent describes a method for agglomerating food powders.

U.S. Pat. No. 2,957,771 to Prater, et al. describes a porous aggregated form of dehydrated garlic and onion powders. The aggregated form of the garlic and onion powder improves the flavoring effect of the dehydrated powder and facilitates even distribution of the dehydrated powder in food.

It is a principal object of the present invention to provide a method for improving the dispersability and hydration of herbs and spices.

It is another object of the present invention to provide a herb and/or spice blend with improved dispersion and hydration characteristics for the addition to viscous sauces, such as a cheese sauce.

SUMMARY OF THE INVENTION

The present invention is directed to a method for improving the dispersability and hydration of herbs and spices into a viscous sauce. In the method, at least one herb or spice is blended with an agglomerated maltodextrin to provide a dispersable and easily hydrated herb and/or spice blend. The invention is also directed to a herb and/or spice blend which is dispersable and easily hydrated in a viscous sauce. The herb and/or spice blend is a mixture of at least one herb or spice and an agglomerated maltodextrin.

DETAILED DESCRIPTION OF THE INVENTION

Many convenience foods are available which combine a separate spice package which is to be added to a particular food. Often the food package will also contain a viscous sauce which is combined with another food product and the spice package is blended with the viscous sauce and food product. The viscous sauce will usually have a viscosity at ambient temperature of from about 50,000 to about 800,000 cp. One particular example of such convenience food is the well-known macaroni and cheese package. The cheese is in the form of a cheese sauce. When the consumer utilizes the pasta portion of the package, the pasta is added to boiling water and cooked for about 8 minutes. The water is drained and the cheese sauce is added to the pasta. The cheese sauce blends readily with the pasta. When a separate package of herbs and/or spices is provided with the food package, however, there is a problem of incorporating the herbs and/or spices into the mixture of cheese sauce and pasta. The herbs and spices tend to clump up and provide an unappetizing appearance and accumulation of herb or spice material in various places.

In accordance with the present invention, it has been discovered that if the herbs and spices are blended with an agglomerated maltodextrin, the herbs and spices are readily distributed throughout the mixture of cheese sauce and pasta, which facilitates hydration of herbs and spices.

The herbs and spices contemplated for use in the present invention include but are not limited to garlic, onion, mustard flour, parsley, basil and thyme. The herbs and spices have a particle size of from about 50 to about 1,000 microns.

The agglomerated maltodextrin can be any of the commercially available maltodextrins. Such agglomerated maltodextrins are available in a dextrose equivalent (DE) range of from about 4 to about 18. At a dextrose equivalent (DE) of above about 8, a noticeable sweet flavor is imparted by the maltodextrin. For use in the spice blend of the present invention, it is preferred to use maltodextrins having a DE in the range of from about 4 to about 10. The agglomerated maltodextrins have a bulk density of from about 15 to about 25 pounds per cubic foot. The particle size of the maltodextrin is in the range of from about 75 to about 850 microns.

The spice blend mixtures of the present invention generally contain from about 40% to about 95% maltodextrin. All percentages used herein are by weight, unless otherwise indicated. While not wishing to be bound by any theory, it is believed that the agglomerated maltodextrin physically separates the herbs and spices and regulates the hydration rates of herbs and spices while preventing the herbs and spices from clumping or forming pockets.

The following example further illustrates various features of the invention, but is intended to in no way limit the scope of the invention as set forth in the appended claims.

EXAMPLE 1

Two dry herb and spice blend formulations were prepared. One of the herb and spice blend formulations did not contain agglomerated maltodextrins, whereas the other formulation contained 63% agglomerated maltodextrin. The formulation of the two herb and spice blend mixtures is set forth below in Table 1.

TABLE 2

|  | Formulation #1 No Maltodextrin | | Formulation #2 With Maltodextrin | |
| --- | --- | --- | --- | --- |
|  | % | Wt. (g)* | % | Wt. (g)* |
| Powdered Garlic | 29.64 | 1.0849 | 10.85 | 1.0849 |
| Roasted Garlic | 25.77 | 0.9434 | 9.43 | 0.9434 |
| Black Pepper | 6.47 | 0.2370 | 2.37 | 0.2370 |
| Onion Powder | 2.56 | 0.0937 | 0.94 | 0.0937 |
| Mustard Seed | 2.56 | 0.0938 | 0.94 | 0.0938 |
| Crushed Basil | 2.73 | 0.1000 | 1.00 | 0.1000 |
| Powdered Basil | 1.09 | 0.0400 | 0.40 | 0.4000 |
| Parsley | 3.28 | 0.1200 | 1.20 | 0.1200 |
| Oregano | 0.42 | 0.0155 | 0.15 | 0.0155 |
| Thyme | 0.14 | 0.0052 | 0.05 | 0.0052 |
| Salt | 25.32 | 0.9270 | 9.27 | 0.9270 |
| Agglomerated Maltodextrin | 0 | 0 | 63.38% | 6.3385 |
| TOTAL | 100.00 | 3.6604 | 100.00% | 10.0000 |

*The amount of sample added onto 5 oz. of cheese sauce was 3.66 g for formulation #1 and 10 g for formulation #2

A cheese sauce was prepared having the ingredients set forth below in Table 2.

TABLE 2

| Ingredient | % |
| --- | --- |
| Cheddar Cheese | 45.0% |
| Water | 24.5% |
| Cream | 16.0% |
| Non-Fat Dry Milk | 7.8% |
| Disodium Phosphate | 3.0% |
| Salt | 2.5% |
| Lactic Acid | 0.5% |
| Sodium Alginate | 0.5% |
| Annatto | 0.2% |
|  | 100.00 |
| Moisture | 52% |
| Fat | 22% |
| pH | 5.75 |
| Viscosity (cp) at room temp | 420,000 |

5 ounces of the cheese sauce and the herb and spice blend were then added to 4.5 ounces of prepared, drained and cooked pasta. The finished product without agglomerated maltodextrins was lumpy and had numerous unhydrated herb and spice specks. The finished product containing the agglomerated maltodextrin was smooth and free of lumps. The amount of formulation #1 added to the cheese sauce was 3.66 grams and the amount of formulation #2 that was added to the cheese and pasta was 10 grams. The 10 grams of formulation #2, the herb and spice blend also contained 3.66 grams of the herb and spice blend.

What is claimed is:

1. A method for improving the dispersability and hydration of herbs or spices into a viscous sauce comprising blending at least one herb or spice with an agglomerated maltodextrin to provide a dispersable and easily hydrated herb and spice blend, wherein said herb and spice blend has from about 40% to about 95% of said agglomerated maltodextrin.

2. A method in accordance with claim 1 wherein said agglomerated maltodextrin has a bulk density of from about 15 lbs/ft$^3$ to about 25 lbs/ft$^3$.

3. A method in accordance with claim 1 wherein said agglomerated maltodextrin has a dextrose equivalent (DE) of from about 4 to about 10.

4. A method in accordance with claim 1 wherein the particle size of said herb or spice is from about 50 to about 1,000 microns and the particle size of said agglomerated maltodextrin is from about 75 to about 850 microns.

5. A method in accordance with claim 1 wherein two or more herbs and spices are present in said herb and spice blend.

6. A method in accordance with claim 1 wherein said viscous sauce is a cheese sauce.

7. A method in accordance with claim 6 wherein said cheese sauce has a viscosity of from about 50,000 to about 800,000 centipoise.

8. A herb and spice blend which is dispersable and easily hydrated in a viscous sauce, said herb and spice blend comprising a mixture of at least one herb or spice and an agglomerated maltodextrin.

9. A herb and spice blend in accordance with claim 8 wherein said agglomerated maltodextrin has a bulk density of from about 15 lbs/ft$^3$ to about 25 lbs/ft$^3$.

10. A herb and spice blend in accordance with claim 9 wherein said agglomerated maltodextrin has a dextrose equivalent (DE) of from about 1 to about 10.

11. A herb and spice blend in accordance with claim 9 wherein said herb and spice blend has from about 40% to about 95% of said agglomerated maltodextrin.

12. A herb and spice blend in accordance with claim 9 wherein the particle size of said powdered spice is from about 50 to about 1,000 microns and the particle size of said agglomerated maltodextrin is from about 75 to about 850 microns.

13. A herb and spice blend in accordance with claim 9 wherein two or more herbs or spices are present in said herb and spice blend.

14. A convenience food package comprising pasta, a separate package of cheese sauce and a separate package of at least one herb or spice which has been blended with an agglomerated maltodextrin to provide a dispersible and easily hydrated herb or spice blend.

15. A convenience food package in accordance with claim 14 wherein said agglomerated maltodextrin has a bulk density of from about 15 lbs/ft$^3$ to about 25 lbs/ft$^3$.

16. A convenience food package in accordance with claim 14 wherein said agglomerated maltodextrin has a dextrose equivalent (DE) of from about 4 to about 10.

17. A convenience food package in accordance with claim 14 wherein said herb and spice blend has from about 40% to about 95% of said agglomerated maltodextrin.

18. A convenience food package in accordance with claim 14 wherein the particle size of said herb or spice is from about 50 to about 1,000 microns and the particle size of said agglomerated maltodextrin is from about 75 to about 850 microns.

19. A convenience food package in accordance with claim 14 wherein two or more herbs and spices are present in said herb and spice blend.

20. A convenience food package in accordance with claim 19 wherein said cheese sauce has a viscosity of from about 50,000 to about 800,000 centipoise.

* * * * *